United States Patent
Valette

[19]

[11] Patent Number: 5,807,026
[45] Date of Patent: Sep. 15, 1998

[54] DEVICE FOR PULLING THE END OF AN OPTIC FIBER CABLE, IN PARTICULAR AN UNDERWATER CABLE TYPE

[75] Inventor: Jean-Marc Valette, La Seyne-Sur-Mer, France

[73] Assignee: France Telecom, Paris, France

[21] Appl. No.: 668,591

[22] Filed: Jun. 19, 1996

[30] Foreign Application Priority Data

Jun. 19, 1995 [FR] France ................................. 95 07303

[51] Int. Cl.⁶ ............................... F16L 1/04; G02B 6/36; E21B 43/00
[52] U.S. Cl. ........................ 405/158; 254/134.5; 385/81; 385/87; 405/154; 405/157
[58] Field of Search .................................... 405/154, 156, 405/158, 157; 254/134.3 R, 134.4–134.7; 385/87, 81, 83, 136

[56] References Cited

U.S. PATENT DOCUMENTS

| | | | |
|---|---|---|---|
| 4,113,236 | 9/1978 | Neinast | 254/134.5 |
| 4,207,428 | 6/1980 | Cosier et al. | |
| 4,569,420 | 2/1986 | Pickett et al. | 254/134.5 X |
| 4,684,161 | 8/1987 | Egner et al. | |
| 4,684,211 | 8/1987 | Weber et al. | |
| 4,744,622 | 5/1988 | Cherry et al. | 385/87 |
| 4,911,579 | 3/1990 | Lutz et al. | 405/154 X |
| 5,013,125 | 5/1991 | Nilsson et al. | 254/134.5 R |
| 5,418,874 | 5/1995 | Carlisle et al. | 385/81 X |

FOREIGN PATENT DOCUMENTS

| | | |
|---|---|---|
| 0 520 946 | 12/1992 | European Pat. Off. |
| 35 12 261 | 10/1986 | Germany . |
| 2205685 | 12/1988 | United Kingdom . |

*Primary Examiner*—Dennis L. Taylor
*Attorney, Agent, or Firm*—Pollock, Vande Sande & Priddy

[57] ABSTRACT

An assembly for pulling the end of a cable includes a hollow anchoring body having an axial passage formed in a front end thereof for receiving an end of the cable. The anchoring body has an integral hollow cylindrical skirt coaxially extending rearwardly, the skirt receiving an axially positioned insulating ring and a clamping assembly that is located radially inwardly of the ring. The clamping assembly has three sections: (a) a hollow sleeve having an internal thread at a rear end thereof and a tapered shoulder at a front end thereof; (b) a clamping member received in the tapered shoulder of the sleeve; (c) a fastener screwed into the internal thread and abutting the clamping member; and (d) a head formed on the fastener to permit it to be screwed into the thread and apply axial pressure to the clamping member thereby forcing the clamping member to clamp the covering of an optical module of the cable. A removable hollow pulling cover axially abuts the anchoring body and covers the cylindrical skirt. A terminal plate located at an end of the hollow casing, opposite the cylindrical skirt, connects stripped fibers thereto.

7 Claims, 3 Drawing Sheets

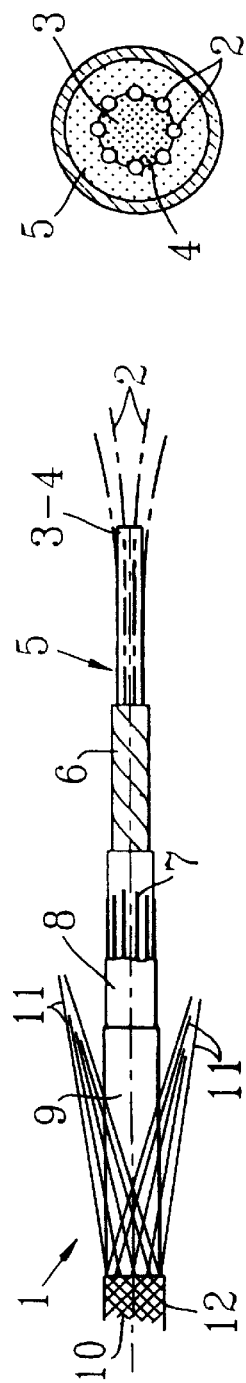
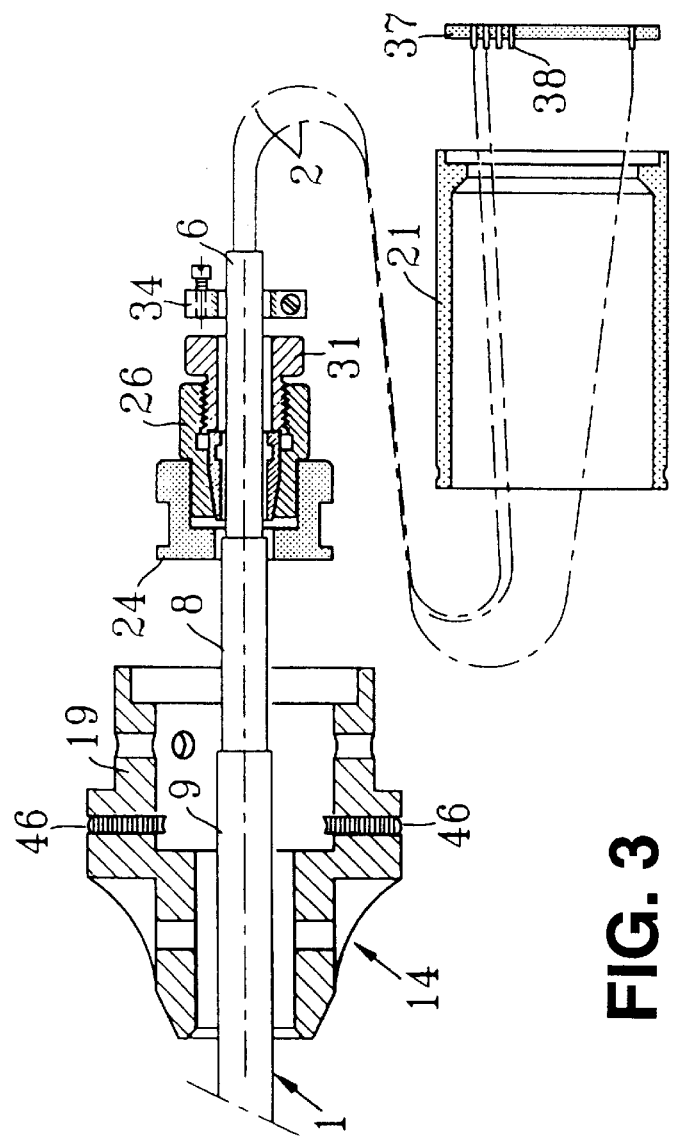

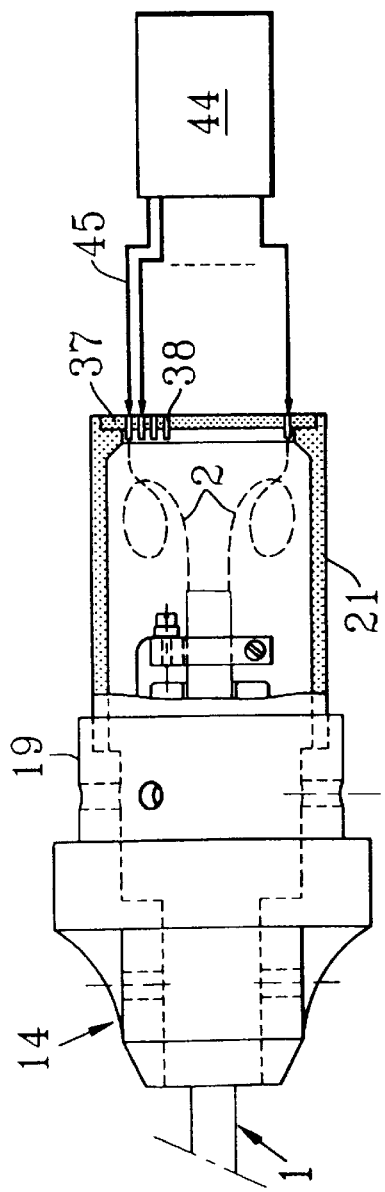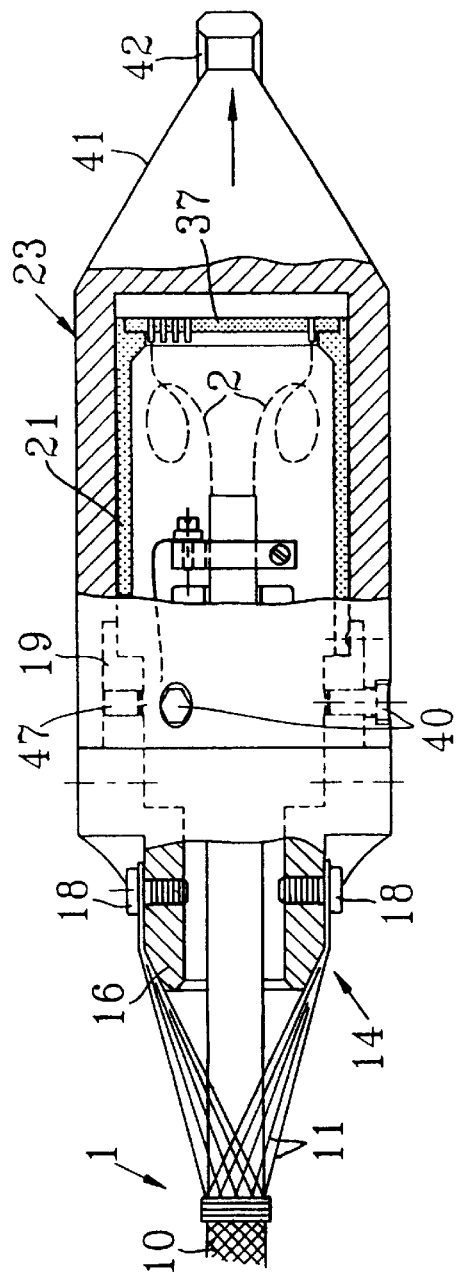

DEVICE FOR PULLING THE END OF AN OPTIC FIBER CABLE, IN PARTICULAR AN UNDERWATER CABLE TYPE

FIELD OF THE INVENTION

The present invention relates to a device for pulling the end of a cable, in particular an optic fiber cable and even more particularly of the underwater cable type, this device at the same time making it possible to carry out electrical or optical measurements easily on the components of this cable, in order to check that the qualities and performances of the latter are preserved over a period of time.

BACKGROUND OF THE INVENTION

It is customary to store underwater cables, held in reserve in an appropriate depot, with the aim of being able to use them on demand for purposes of repair or replacing other cables already in use and which may have a defect or a break.

These cables held in store must be able to be periodically checked in order to verify that their characteristics are maintained, so that their use may be immediately envisaged in the case of necessity.

Now, in current solutions, in order to carry out a measurement on the components of the cable and in particular on the optic fibers which it comprises, it is indispensable to previously prepare the end of this cable in order to remove its outer sheathing and the various protection sheaths in order to expose the optical module formed by the fibers of this cable, contained at the center of the latter and to spread them out individually with a view to carrying out the desired measurements on each of the latter.

Such work for the preparation of the end of the cable is long and delicate. It also requires an appreciable time, of the order of half an hour at least, but which most frequently may exceed one and a half hours, depending on the nature and structure of the cable.

In addition, when the cable has to be handled and in particular laid from a cable-ship, it is necessary to be able to exert an appropriate pulling or tractive force on its end, which must be achieved while not introducing stresses into the optic fibers themselves, which are very fragile, this pulling operation as a general rule requiring the mounting, at the end of the cable, of a pulling member or so called "sock", which may sometimes and consequently become disconnected from the external sheath of the cable, with the drawbacks which result therefrom.

The present invention relates to a device intended to be fixed permanently to the end of the cable in order to ensure the pulling thereof following upon a force exerted on this cable and transmitted exclusively to the sheath of the latter, without reactions on the optic fibers themselves, this device being arranged in order to make it possible, furthermore, to carry out electrical or optical measurements on these fibers in a simple manner, quickly and reliably.

Although it may be envisaged with other structures, the invention relates more particularly to an optic fiber cable comprising in succession, from the center towards the periphery; an internal optical module, formed by a plurality of fibers sheathed individually, preferably but not necessarily housed in notches uniformly distributed in the outer surface of a central insulating support rod; a covering, constituted by a plastics material in particular in the form of a tape, wound continuously on the optical module; a set of metal reinforcing wires, arranged longitudinally around the covering of the module, these wires being surrounded by a coaxial casing, also of metal; a protective sheath, surrounding the metal casing, made of plastics material such as polyethylene; and possibly an outer sheathing formed by a braid of interwoven metal wires, advantageously coated with a layer of pitch or tar in order to perfect the protection against corrosion by sea water.

According to the invention, the pulling device in question is characterized in that it comprises a hollow anchoring body comprising an axial passage in which is engaged (with a small clearance) the end of the protective sheath previously separated from the external sheathing. This body is extended by a cylindrical skirt receiving an insulating ring and a clamping arrangement in several parts; one is constituted by a hollow sleeve receiving in its inside a clamp and a nut, which is engaged on an internal screw-thread of the sleeve, in order to exert by the screwing of this nut. A pushing force on the clamp, cooperates, by virtue of a conical outer profile, with a shoulder of the sleeve while becoming tighter on the end of the protective sheath, a connection for connecting by gripping the covering of the module projecting from the protective sheath beyond the nut, a plate with terminals for the connection of the ends of the fibers appropriately stripped in their part extending from the sheath and the covering, this plate being mounted at the end of a hollow casing extending the cylindrical skirt of the anchoring body; and a pulling cover covering the hollow casing and the cylindrical skirt, this cover being rendered integral with the anchoring body by removable connection means.

The device according to the invention makes it possible in particular, after having stripped the end of the cable, in particular to cause the fibers of the optical module to project therefrom, which fibers may spread out freely and be connected to the plate comprising terminals, to connect the outer protective sheath to the anchoring body by means of the insulating ring and clamping arrangement, without creating stresses on the fibers themselves.

These fibers which may be coiled according to their length inside the hollow casing fitting on the skirt extending the anchoring body, are permanently protected with regard to the outside and, by the connecting terminals of the plate, may be immediately connected to any appropriate measuring apparatus.

Once these measurements have been carried out, the pulling cover may be easily fitted and connected to the anchoring body, ensuring additional protection of the fibers, while making it possible to exert a tractive force on the cable necessary for its laying. At any time, the cover may be removed in order to carry out on the terminals of the plate a new measurement in relation to the fibers, without the latter having to undergo any other intervention.

According to a particular feature of the device in question, the anchoring body comprises, remote from its cylindrical skirt, a front part, of general conical shape, in which are provided holes which are suitably tapped for receiving screws for immobilizing the wires of the braid of the outer sheathing known as a sock, thus improving the connection of the body and of the sheath for protecting the cable.

According to another feature there is also fixed to the optical module a rider, which comprises a central slot for the passage of this module, this slot being defined by two parallel arms, able to be lightly pressed one towards the other thus trapping the module by means of a transverse screw. This rider connected to a connector allows the remote supply of the cable necessary for electrical measurements.

According to yet another feature, the pulling cover is provided in its front part, remote from the anchoring body, with a lug comprising a through hole, able to allow the mounting on the cover of a sling or the like, ensuring the tractive force on the cable.

Further features of a cable pulling device constructed according to the invention, will also become apparent from the ensuing description of one embodiment, given by way of example and in a non-limiting manner, with reference to the accompanying drawings, in which:

BRIEF DESCRIPTION OF THE FIGURES

FIGS. 1 and 2 are diagrammatic views, respectively in elevation and in cross-section, to an enlarged scale, of a cable comprising optic fibers, of the underwater cable type, illustrating the particular structure of the latter.

FIGS. 3, 4 and 5 are more diagrammatic views, making it possible to better explain the relative mounting of the various parts which make up the device (FIG. 3), in order to carry out measurements on the fibers (FIG. 4), then the pulling of the cable with a view to its laying (FIG. 5).

DETAILED DESCRIPTION OF THE INVENTION

Figure 6:
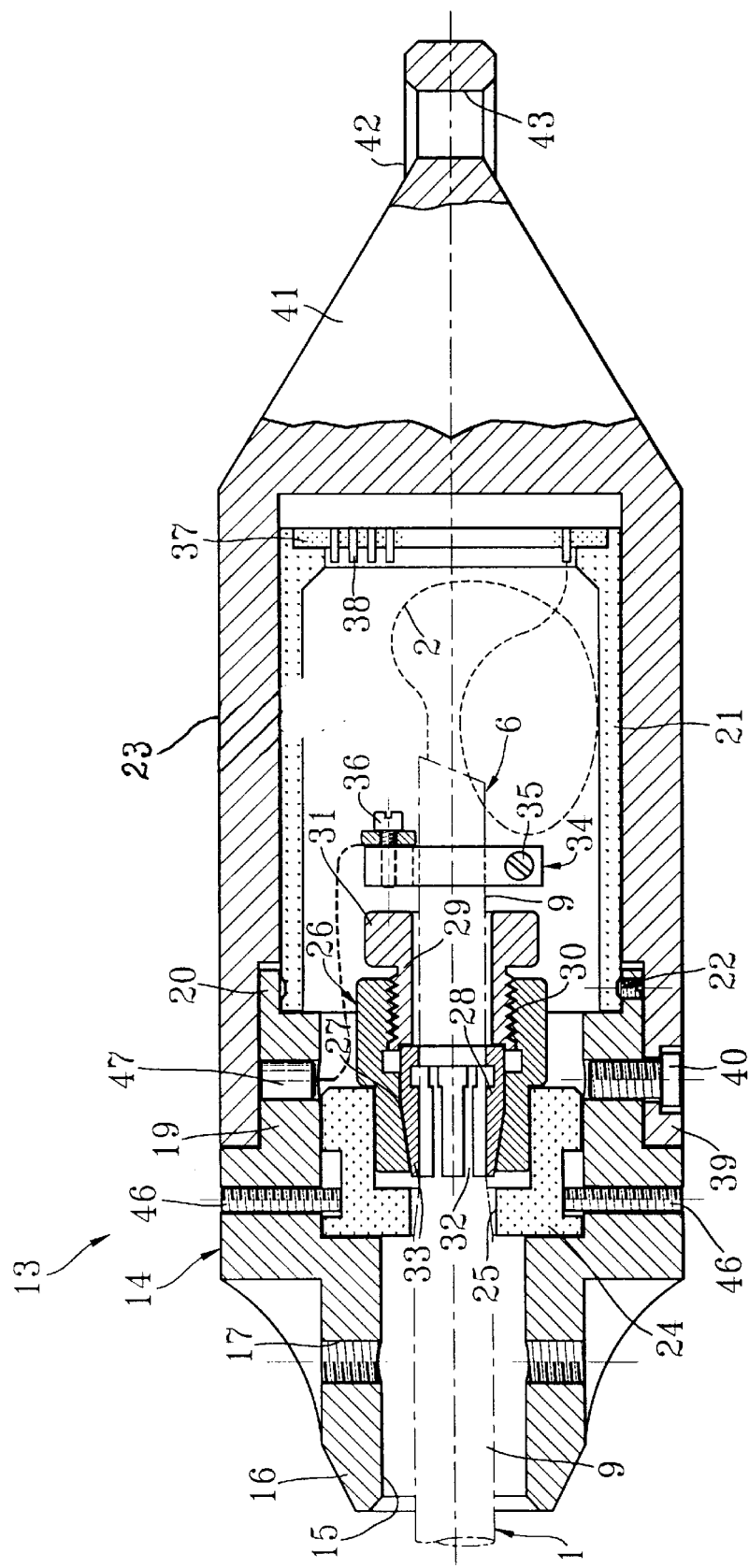
FIG. 6 is a sectional view, on an even greater scale, of the end of the cable illustrated in FIGS. 1 and 2 and of the pulling device according to the invention, attached and fixed to this end.

In the example in question, the cable illustrated, designated in its entirety by the reference numeral 1, is more particularly intended for underwater use for the transmission of telecommunication signals.

To this end, this cable comprises from the center towards its periphery, a series of optic fibers 2, sheathed individually, these fibers being preferably, but not necessarily, supported by a central rod 3 and disposed in notches 4 uniformly distributed in the outer surface of the latter. As a variation, the fibers could be simply placed loose, parallel to each other.

These fibers together form an optical module 5, which is provided with an outer covering 6, preferably produced by means of an insulating plastics material in the form of a tape, wound continuously on the module 5 according to the length of the cable.

The module 5 provided with its covering 6 is associated with metal reinforcing wires 7, distributed on the outer surface of the covering, in order to give the arrangement relative rigidity, these wires 7 themselves being housed inside an outer casing 8, preferably of copper, which is grounded, during the operation of the cable, by any appropriate means.

The casing 8 is in turn surrounded on the outside by a protective sheath 9, preferably of plastics material of the polyethylene type, able to effectively protect the optical module and above all to ensure that the cable is sealed over its entire length.

Finally, the cable 1 may comprise an outer sheathing 10 or sock, constituted by a braid of metal wires 11, with, if necessary, impregnation by a layer 12 of pitch or tar, intended to protect them against corrosion by sea water.

FIG. 6 illustrates in a detailed manner the structure of the pulling device mounted at the end of the cable 1, in particular after the latter has been stripped over a sufficient length of its outer sheathing 10, whereof the braid of metal wires is immobilized in the manner described hereafter.

The pulling device designated in its entirety by the reference numeral 13 mainly comprises an anchoring body 14, comprising an axial passage 15, allowing the free engagement with sufficient clearance of the end of the sheath 9 for protecting the cable, which is extended inside the body, substantially beyond the latter.

The body 14 comprises a front part 16 in which are provided tapped holes 17, oriented transversely towards the axial passage 15, these bores being intended to receive locking screws 18 for the metal wires of the sock 10, as shown diagrammatically in FIG. 5.

The part 16 of the body 14 is extended at the opposite side by a cylindrical skirt 19, terminated by a flange 20 in which there may be fitted the corresponding end of a hollow casing 21 inside which the terminal part of the cable and in particular its sheath 9 opens out, beyond which the optical fibers 2 spread out freely remaining coiled in the casing, which under these conditions ensures their protection with regard to the outside.

Advantageously, the casing 21 is connected to the flange 20 of the skirt 19 by grub screws 22, so as not to impede the fitting on the casing of a pulling cover 23 described in more detail hereafter.

Previously placed inside the anchoring body 14 is an insulating ring 24 comprising an axial passage 25 for the end of the sheath 9, this ring being arranged to receive internally a clamping arrangement 26 in three parts, constituting respectively a sleeve 27, a clamp 28 and a locking nut 29.

The sleeve 27 is engaged inside the ring 24 and in its part opposite that which penetrates the latter, comprises a screw thread 30 onto which the corresponding part of the nut 29 can be screwed, which nut is terminated by an end flange 31.

The clamp 28 is in the form of a hollow sleeve, provided in its surface with longitudinal slots 32 and comprises one end 33 having a substantially conical profile, so that, when this end engages in the passage 25 of the ring 24 under the effect of the thrust created by the nut 29 which is screwed into the sleeve, it cooperates with a shoulder of the latter and is clamped progressively on the outer surface of the protective sheath 9, thus immobilizing the latter, without in as much exerting harmful stresses on the optical module which it surrounds.

Mounted on the end of the protection sheath 9 is an immobilizing coupling 34, making it possible in particular, beyond the sheath, to clamp the covering 6 of the optical module 5 and to connect it to a connector 47 for remotely supplying a repeater placed on the connection. To this end, this coupling is in the form of a stirrup member provided with a central slot in which the module with its covering engages and whereof the two arms may be appropriately moved towards each other in order to clamp the latter by means of a screw 35.

The stirrup member 34, fixed in position with respect to the nut 31, is connected to the connector 47 by an insulated copper wire.

The optic fibers 2, which are stripped and free, in the hollow casing 21, may then be easily connected to a plate 37 mounted at the end of this casing remote from the anchoring body 14, this plate comprising a series of terminals 38 allowing for each one the connection of one of the fibers of the module.

The pulling cover 23 covers on the outside the casing 21 and comprises a terminal edge 39 which covers the skirt 19 of the body 14, the two parts being finally connected to each other by screws 40.

The cover 23 comprises a front part 41, beyond the plate 37 comprising terminals, this front part terminating in a lug 42 provided with a through hole 43 in which may be fixed a connecting link (not shown) provided at the end of a sling, making it possible to exert on the cable the pulling force necessary for its laying.

FIGS. 3 to 5 usefully complete the preceding description and in particular explain the various phases of the mounting of the device.

In a first stage, as shown diagrammatically in FIG. 3, the end of the cable 1 is stripped of its sheathing in order to allow the engagement of the anchoring body 14 on the protective sheath 9, before the latter is locked in position on the ring 24 by two screws 46 and the clamping arrangement 26.

The optic fibers 2 are stripped and coiled in the hollow casing 21, their ends being connected to the terminals 38 of the plate 37.

The casing 21 is then connected to the skirt 19 extending the anchoring body 14, the terminals 38 being able to be connected to any desired measuring apparatus, such as that shown by the reference numeral 44 in FIG. 4, through the intermediary of connections 45.

Once the measurements have been made, the apparatus 44 is removed, the pulling cover 23 being fitted on the anchoring body 14 and connected to the latter by the screws 40, the cable being able to be pulled and laid according to any appropriate method.

It should be noted that, at any instant, the cover 23 may be separated in order to carry out a new measurement, without necessitating any other intervention on the optic fibers themselves, before it is refitted, in the position shown in FIG. 5.

Naturally, it is obvious that the invention is not limited to the embodiment more specifically described above with reference to the accompanying drawings; on the contrary it includes all variations.

I claim:

1. An assembly for pulling the end of a cable, the cable including, in a radially outwardly direction—an internal optical module formed by a plurality of fibers individually sheathed; a covering for the optical module; a set of metal reinforcing wires; and a protective sheath, the assembly comprising:

a hollow anchoring body having an axial passage formed in a front end thereof for receiving an end of the cable with a predetermined clearance therebetween;

the anchoring body having an integral hollow cylindrical skirt coaxially extending rearwardly, the skirt receiving an axially positioned insulating ring and a clamping assembly that is located radially inwardly of the ring, the clamping assembly having three sections-
  a) hollow sleeve having an internal thread at a rear end thereof and a tapered shoulder at a front end thereof;
  b) a clamping member received in the tapered shoulder of the sleeve;
  c) a fastener screwed into the internal thread and abutting the clamping member; and
  d) a head formed on the fastener to permit it to be screwed into the thread and apply axial pressure to the clamping member thereby forcing the clamping member to clamp the covering of the optical module;

a coupling clamped to an exposed section of the covering of the optical module that extends inwardly beyond the fastener head;

a hollow pulling cover axially abutting the anchoring body and covering the cylindrical skirt;

a hollow casing positioned within the pulling cover and axially coextensive with the cylindrical skirt;

means for removably connecting the cover with the anchoring body; and a terminal plate located at an end of the hollow casing, opposite the cylindrical skirt, for connecting stripped fibers thereto.

2. The apparatus set forth in claim 1 wherein the anchoring body further comprises a tapered forward end portion, spaced from the cylindrical skirt, and including tapped holes; and fasteners received in the holes for clamping braided shielding wires of the cable to the anchoring body.

3. The apparatus set forth in claim 1 wherein the coupling further comprises a bifurcated ring, and a fastener passing through free ends of the ring for tightening the ring about the optical module.

4. The apparatus set forth in claim 2 wherein the coupling further comprises a bifurcated ring, and a fastener passing through free ends of the ring for tightening the ring about the optical module.

5. The apparatus set forth in claim 3 further comprising a connector mounted in the anchoring body, and a wire connected between the mounted connector and the ring.

6. The apparatus set forth in claim 4 further comprising a connector mounted in the anchoring body, and a wire connected between the mounted connector and the ring.

7. The apparatus set forth in claim 1 further comprising lug means mounted to a free end of the pulling cover, at an end opposite the anchoring body, for allowing the connection of a pulling device.

* * * * *